ULTRASONIC ACOUSTIC WAVE TRANSMISSION DELAY LINES

Filed Sept. 3, 1952 2 Sheets-Sheet 1

INVENTOR
M. D. FAGEN
BY
ATTORNEY

Nov. 4, 1958 M. D. FAGEN 2,859,415

ULTRASONIC ACOUSTIC WAVE TRANSMISSION DELAY LINES

Filed Sept. 3, 1952 2 Sheets-Sheet 2

INVENTOR
M. D. FAGEN
BY [signature]
ATTORNEY

United States Patent Office 2,859,415

Patented Nov. 4, 1958

2,859,415

ULTRASONIC ACOUSTIC WAVE TRANSMISSION DELAY LINES

Morton D. Fagen, Summit, N. J., assignor to Bell Telephone Laboratories, Incorporated, New York, N. Y., a corporation of New York Application September 3, 1952, Serial No. 307,680

5 Claims. (Cl. 333—30)

This relates to ultrasonic acoustic wave transmission delay lines and to the attachment of energy absorbing cells or areas to acoustic delay lines.

In the manufacture of acoustic delay lines, it has been found that the use of solid transmission or delay media such as fused or vitreous silica, glass, or aluminum has practical advantages over the use of liquid media typified by mercury. Flexibility in design as well as other advantages such as freedom from contamination and ease of portability favor the use of solid delay lines.

In such delay lines using either single or multiple reflection transmission paths, such as are disclosed in the applications of H. J. McSkimin, Serial No. 125,049, filed November 2, 1949, and Serial No. 151,175, filed March 22, 1950, now Patent 2,672,590 the attenuation of stray or divergent vibrations has been accomplished by absorbing cells or areas of eutectic solder melted onto the delay medium at the points where absorption is desired. Lead base solder has been used because of its high acoustic attenuation factor, comparatively low melting point, and because the acoustic impedance of some lead base solders is reasonably close to that of vitreous silica, a commonly used delay medium. The eutectic lead-tin-bismuth solder is commonly used as an absorber medium because its acoustic impedance, $\rho V$, is but 1.6 times the value of the acoustic impedance of vitreous silica and its melting temperature of 95° C. is as low as may be obtained in solders having an acoustic impedance in the same order of magnitude as that of vitreous silica. In spite of the use of such low temperature melting solders, difficulty has been encountered after manufacture of delay lines, in fracturing of the delay medium at the absorber bond upon a reduction in temperature, resulting in destruction of the delay line. At best, using the lead-tin-bismuth solder there is a marked reflection at the boundary of the media due to the mismatch of impedances.

An object of this invention is to improve the acoustic absorption characteristics of absorber cells for delay lines. More specifically, it is an object of this invention to enable and facilitate the intimate attachment to acoustic delay lines of a vibration absorbing material having an acoustic impedance matching that of the delay medium.

Another object of this invention is to expedite the attachment of absorber areas to delay lines at room temperature to minimize thermal stress in the absorber bond.

Still another object of this invention is to enable the attachment of acoustic absorbing areas to piezoelectric crystals without damage to the crystal or its coating.

In one specific embodiment of this invention, a piezoelectric crystal is affixed to a silver paste cap on one end of a rod of vitreous silica. At the opposite end of the rod an electroplated alloy absorber is formed on a similar cap of silver paste. The alloy is composed of approximately 70 percent lead and 30 percent tin, and has been found to have an acoustical impedance to ultrasonic mechanical vibrations in a transverse mode equal to the acoustical impedance of vitreous silica. In operation a pulsed signal is impressed upon the piezoelectric crystal and the amount of attenuation of the reflected signal indicates the extent of acoustic loss in the absorber and the degree of impedance matching.

The absorber is applied by a process which includes electroplating of lead and tin simultaneously upon a silver paste coating on the delay medium. Two electrodes, one tin and the other lead, are used and both the amount of the absorber and lead-tin proportions are controllable to give the thickness of the absorber required and a prescribed acoustical impedance depending upon the proportion of the electroplating current through each electrode.

A feature of this invention relates to the intimate coating of acoustic absorbing material on the delay medium, having an acoustic impedance matching that of the delay medium.

Another feature of this invention is the attainment of a comparatively stress free bond between the absorber and the delay medium.

Another feature is the simplicity of application of the absorber simultaneously to numerous discrete portions of the delay medium.

Additional features of this invention include the direct control of the absorber acoustical impedance during application and that the process is conducted at room temperature.

A complete understanding of this invention may be had from the following detailed description with reference to the accompanying drawing in which.

Figure 1:
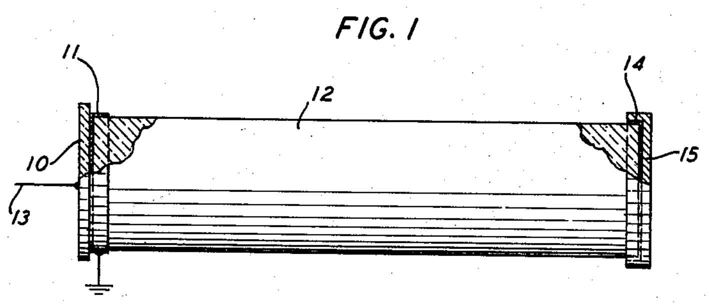
Fig. 1 is an elevational view of a cylindrical delay line, shown partly in section.

Referring now in detail to the drawing, in Fig. 1, a piezoelectric crystal 10 is affixed to silver paste cap 11 following the process disclosed in the application of A. W. Ziegler, Serial No. 246,276, filed September 12, 1951, now Patent 2,709,147. The silver paste cap 11 is baked onto one end of a vitreous silica delay rod 12. Electrical connections to crystal 10 are made through a wire 13 and cap 11. At the end of rod 12 opposite the crystal 10, a cap 14 of baked silver paste similar to cap 11 is attached. An absorber 15 is electroplated upon the silver paste cap 14 in accordance with the process hereinafter described. The acoustic absorber is an alloy of lead and tin in the proportion of 70 percent lead and 30 percent tin. The absorber thickness of approximately 30 mils is sufficient for relatively complete absorption of transverse waves in the megacycle range of frequencies. The silver paste cap 14 is approximately 1/10 mil in thickness. Both the absorber and the silver paste coatings are magnified in the drawing for a clearer representation rather than to show the relative sizes of the components of the delay line.

The impedance matching lead-tin absorber prevents unwanted reflections at the delay medium boundary and promotes complete absorption of all signals impinging upon the absorber. The acoustic loss characteristic of this lead-tin alloy is in the nature of 300 times that of fused silica so that the quantity of absorptive material which must be applied to accomplish the desired attenuation is slight. For example, a layer of 30 mils in thickness is sufficient to attenuate by 22 decibels a signal impressed perpendicular to the absorber's surface.

Figure 2:
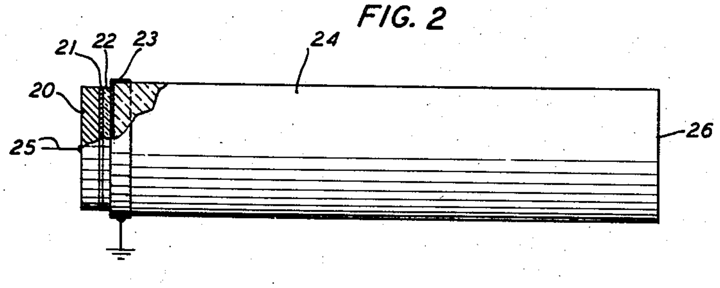
Fig. 2 is an elevational view, partly in section, of a delay line with the absorber applied to the back of the piezoelectric crystal.

Fig. 2 shows an absorber application in a delay line which uses a single piezoelectric crystal as the input and output transducer of pulsed signals. In this embodiment, mechanical vibration absorption at the crystal end of the rod is desired to prevent reflection of a received signal back to the line, only to be received again as an unwanted pulse. With absorption of the energy of the received pulse by an absorber on the rear face of the crytal, the intensity of reflected signals is reduced. Another advantage of coating the rear face of the crystal with acoustic absorber is that the absorber constitutes a mechanical load upon the outer face of the crystal. Mechanically loading the outer face of the crystal reduces the electrical impedance looking into the delay line resulting in increased band-width signal transmission. This embodiment comprises an absorber 20 electroplated onto a silver paste layer 21 on one side of the piezoelectric crystal 22. The crystal 22 is affixed to a silver paste cap 23 on one end of a cylindrical vitreous silica delay rod 24. Electrical connections to the crystal 22 are made through a wire 25 and cap 23 similar to the connections shown in Fig. 1. Opposite the end of the delay rod 24, having the crystal 22 and absorber 20 attached, is a ground reflective end surface 26.

Figure 3:
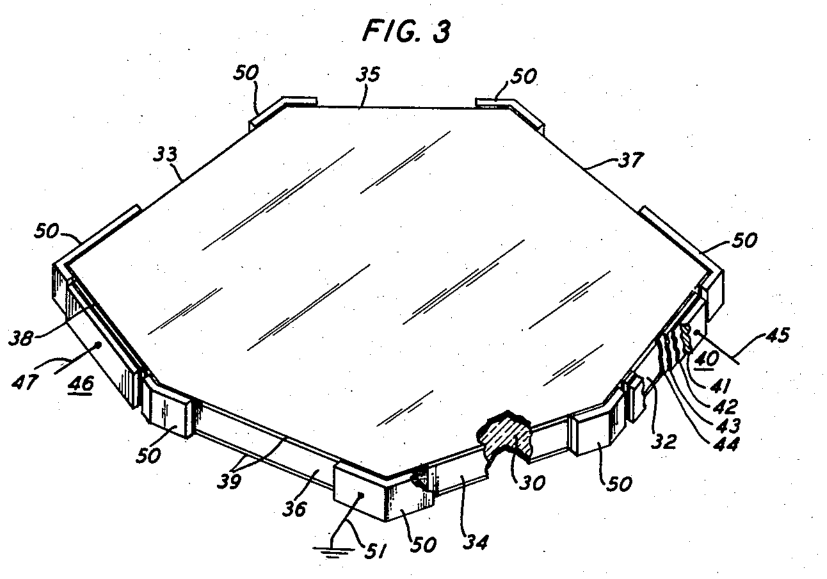
Fig. 3 is a perspective view of multifacet delay line with absorber material applied both to the delay medium and to the back faces of the piezoelectric transducers, portions of the delay medium, crystal mount and absorber being broken away for clarity.

Fig. 3 depicts a multifacet delay line having a series of internal reflective and absorptive areas to give a longer signal delay than in straight delay lines without undue increase in size. The delay line comprises a plate or sheet 30 of fused or vitreous silica having several ground facets or faces 32, 33, 34, 35, 36, 37, and 38. The sheet 30 has a silver paint coating 39 on both the top and bottom. On the facet 32 is an input crystal assembly generally designated 40 comprising an acoustic absorber 41 electroplated upon a silver paste layer 42. The layer 42 is baked upon the outer face of an input crystal 43, the inner face of which is attached to facet 32 coated with a silver paste layer 44. The input crystal assembly 40 is electrically connected by wire 45 soldered to absorber 41. On facet 38 is an output crystal assembly 46 similar to that of the input crystal assembly 40. The output of the delay line is through wire connection 47 soldered to output crystal assembly 46.

A series of acoustic absorbers 50 are electroplated upon the corners of the delay line 30. The corner absorbers 50 in this embodiment are grounded at connection 51 to form the second connection, besides the wires 45 and 47 to the crystal assemblies 40 and 46. The center portion of each of the facets 32, 33, 34, 35, 36, 37 and 38 has ben ground smooth and is free from coating. These planar areas are designed to reflect a pulsed signal from the input crystal 43 so that the ultrasonic vibrations traverse the confines of the delay line 6 times to each of the facets in the order designated by the reference numerals before impinging upon the output crystal assembly 46. The smooth areas are of sufficient size to reflect the major part of the signal. Any part of the signal unduly diverging from the prescribed path will strike a portion of the absorbers 50 and be attenuated, preventing false reflections from arriving at the output crystal assembly 46. In this embodiment, the major surfaces of the sheet 30 were painted with a silver paint offering some absorption but these surfaces may be coated with impedance matching absorbers in accordance with this invention.

Figure 4:
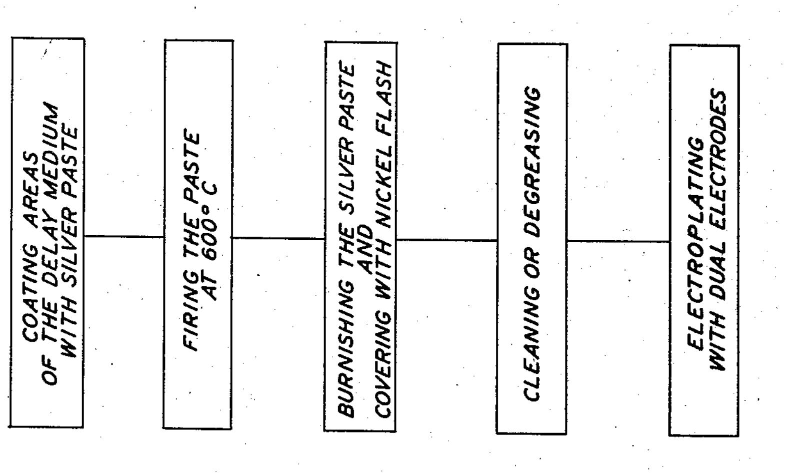
Fig. 4 is a flow chart showing the steps in the process of this invention.

The acoustic absorbers in the above-described embodiments are applied in accordance with the following process illustrated in Fig. 4. The fused or vitreous silica parts are prepared for electroplating by being coated on the areas to be absorptive with a silver paste described in Patent 2,461,878 to C. J. Christensen et al., issued February 15, 1949, after which the silver paste is fired 600° C. Following the firing the paste is burnished and then may be covered with nickel flash to protect the fired silver paste from any harmful action of the plating bath. The paste coated silica delay line is then degreased by scrubbing with Vienna lime until all evidence of oily residue is removed prior to electroplating.

The plating bath for lead-tin absorbers is a fluoroborate lead-tin electrolytic of the following composition:

| | Gms./liter |
|---|---|
| Tin (stannous) | 25 |
| Lead | 65 |
| Free fluoroboric acid | 40 |
| Free boric acid | 25 |
| Glue | 1 |

The bath is kept at room temperature and subjected to mild agitation during electroplating. The electroplating of this variable proportion alloy absorber requires dual electrodes, one lead and the other tin. For a 70 percent lead, 30 percent tin alloy, seven eighths of the current is passed through the lead electrode and one eighth through the tin electrode. With a current density of 30 amperes per square foot, the absorber is plated at a rate of 0.004 inch per hour. This speed allows accurate control of the thickness of the absorber coating.

Figure 5:
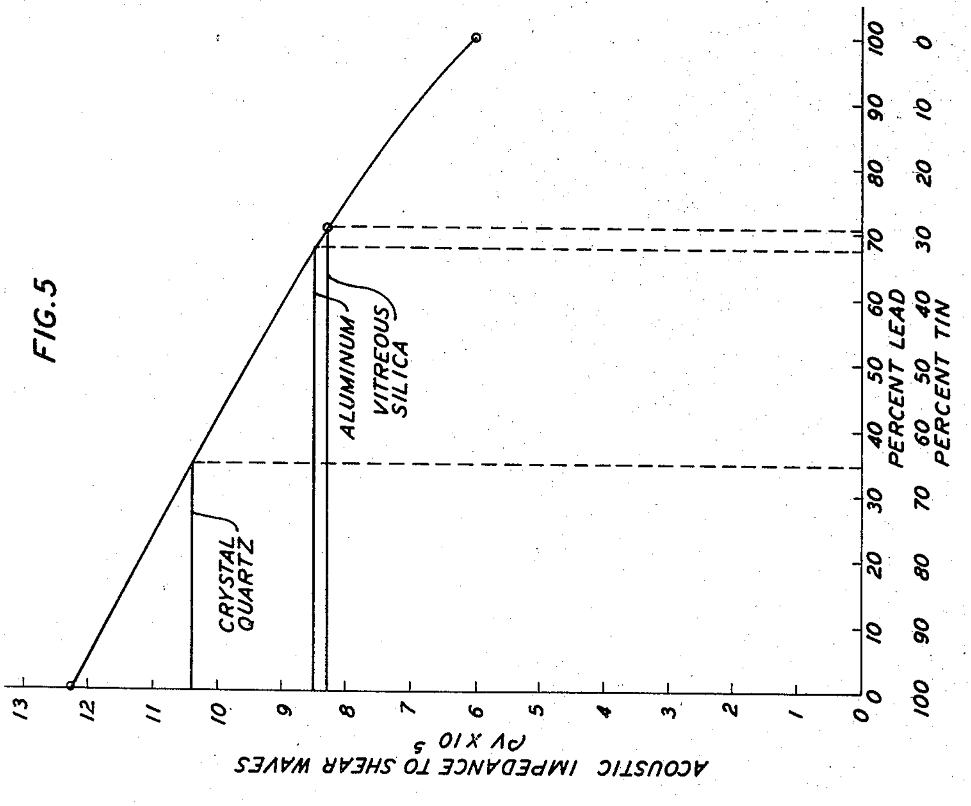
Fig. 5 is a graphical representation of the acoustical impedance to shear waves of lead-tin alloy with changes in the proportion of lead and tin.

Fig. 5 shows results of a study of the substantially straight line variation in the acoustical impedance with change in proportion of lead and tin in the absorber alloy. The variation in $\rho V$ is from 6 to 12.2 times $10^5$ mechanical ohms as the proportion of lead and tin is changed from 100 percent lead to 100 percent tin. The acoustical impedance to shear waves in mechanical ohms times $10^5$ of the following significant delay line materials falls within this range:

| | |
|---|---|
| Vitreous silica | 8.3 |
| Crystal quartz | 10.4 |
| Aluminum | 8.5 |

By changing the proportion of current through each of the dual electrodes to give the prescribed alloy composition, acoustic absorber areas may be electroplated in an impedance match with the above-mentioned delay line materials. When a conducting material such as aluminum is used, the step in the process of coating with a conducting paste before electroplating may be eliminated.

It is understood that other high acoustic loss materials such as bismuth or cadmium may be used in place of either lead or tin to give an additional range of acoustic impedance suitable for matching the impedance of other delay materials. It is also understood that acoustic absorbing areas may be electroplated to match the acoustic impedance of delay media in which longitudinal or torsional waves are utilized.

In addition to the improved electrical or acoustic properties of this absorber, important advantages of this method of absorber application are that the danger of fracturing the delay medium or the crystal transducers upon temperature changes is all but eliminated because the absorber is applied at room temperature rather than at elevated temperatures as in the case of melted-on absorbers. Despite a marked difference in coefficients of thermal expansion of the absorber materials and fused silica, there was no evidence of damage to the delay line when cooled to a temperature of —70° C. Using prior art processes a complete rupture of the delay line at the solder bond was suffered upon a reduction in temperature to —40° C.

This absorber is also adapted for application to intricately designed delay lines. The absorber itself requires negligible space and will not limit the design of the delay line. This invention instead facilitates the manufacture of the delay lines, for all of the absorber areas may be simultaneously electroplated upon the delay medium and the piezoelectric crystals. Internal corners or recesses to be absorber coated offer less problem with this process than when using melting on techniques. Furthermore, the present invention is suitable for the application of absorbers to piezoelectric crystals themselves without damage to the crystal or its coating.

It is to be understood that the above-described arrangements are illustrative of the application of the principles of the invention. Numerous other arrangements may be devised by those skilled in the art without departing from the spirit and scope of the invention.

What is claimed is:

1. The combination in an acoustic delay line of a delay medium, signal input and output means, and a layer of acoustic absorbing material on a portion of said delay medium, said layer constituting an alloy electroplated in situ at room temperature having an acoustic impedance substantially matching the acoustic impedance of the delay medium, said layer being attached to said delay medium by a bond which is comparatively stress free at room temperature.

2. The combination in an acoustic delay line of a delay medium having an acoustic impedance to acoustic wave transmission falling between 6 and 12.5, signal input and output means, and an acoustic absorber electro-deposited at room temperature on portions of the delay medium, said absorber having an acoustic impedance matching that of the delay medium and an acoustic loss characteristic of several times one hundred the magnitude of the acoustic loss factor of the delay medium, said absorber comprising an alloy of lead and tin in a proportion corresponding to the point on the curve of Fig. 5 of acoustic impedance equal to the acoustic impedance of said delay medium, said acoustic absorber being attached to said delay medium by a bond which is thermally stress free at room temperature.

3. The combination in an ultrasonic wave transmission delay line of a solid delay medium, wave input and output crystal means attached to said delay medium, and an ultrasonic wave absorbing layer electro-deposited upon said crystal means at room temperature, said wave absorbing layer comprising a lead base alloy having an acoustic impedance substantially matching the acoustic impedance of the delay medium, and attached to said delay medium by a comparatively stress free bond at room temperature.

4. The method of fabricating high loss acoustic absorbers on the surface of a delay medium comprising coating discrete portions of the delay medium with a conducting paste, firing said paste to convert the paste to a coherent conducting layer secured to such delay medium, and electro-depositing at room temperature an alloy of lead and tin on the coating portions of said delay medium in a proportion constituting an alloy having an acoustic impedance matching that of the delay medium.

5. The method of fabricating high loss acoustic absorbers upon the surface of an acoustic delay medium comprising coating discrete portions of the surface of the delay medium with a conducting paste, firing said paste to convert the paste to a coherent conducting layer secured to the delay medium, and electro-depositing at room temperature an alloy of lead and tin on the conducting layer in the proportion corresponding to the point on the curve of Fig. 5, of acoustic impedance equal to the acoustic impedance of the delay medium.

References Cited in the file of this patent

UNITED STATES PATENTS

| | | |
|---|---|---|
| 928,224 | Shoemaker et al. | July 13, 1909 |
| 1,960,029 | Russell | May 22, 1934 |
| 2,230,205 | Rowland et al. | Jan. 28, 1941 |
| 2,274,444 | Freed | Feb. 24, 1942 |
| 2,308,606 | Ingerson | Jan. 19, 1943 |
| 2,387,772 | Ruben | Oct. 30, 1945 |
| 2,432,657 | Colbert | Dec. 16, 1947 |
| 2,505,515 | Arenberg | Apr. 25, 1950 |
| 2,577,600 | Arenberg | Dec. 4, 1951 |
| 2,624,804 | Arenberg | Jan. 6, 1953 |
| 2,671,746 | Brew | Mar. 9, 1954 |
| 2,672,590 | McSkimin | Mar. 16, 1954 |